Figure 1:
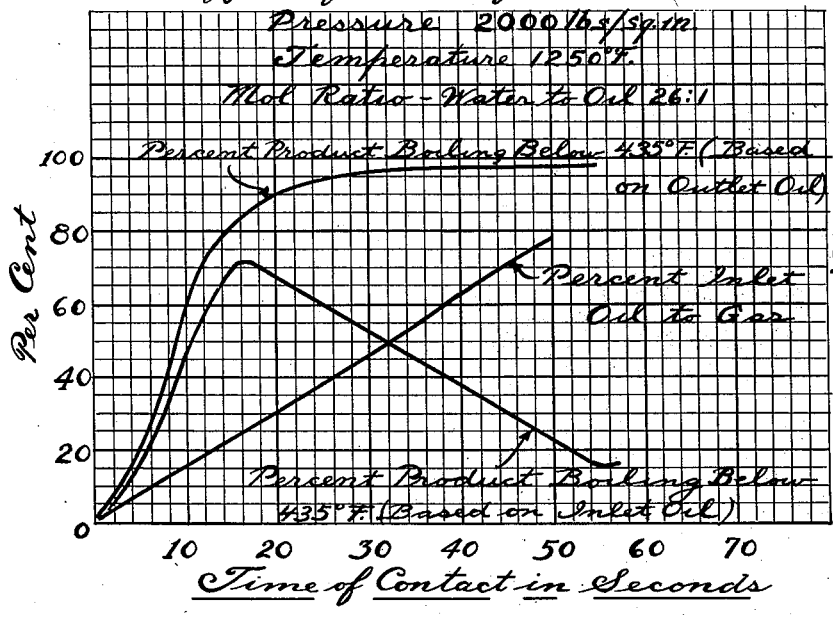

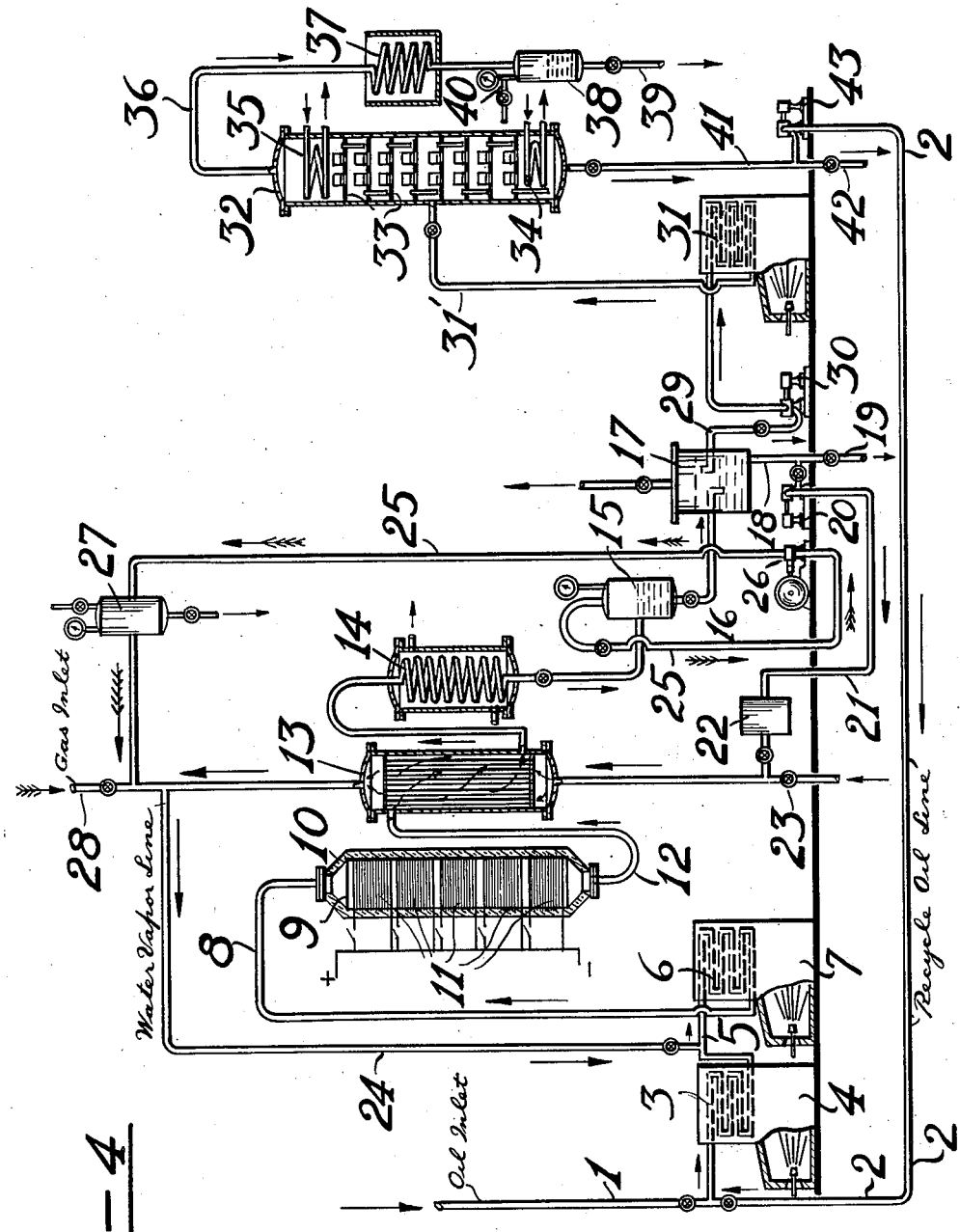

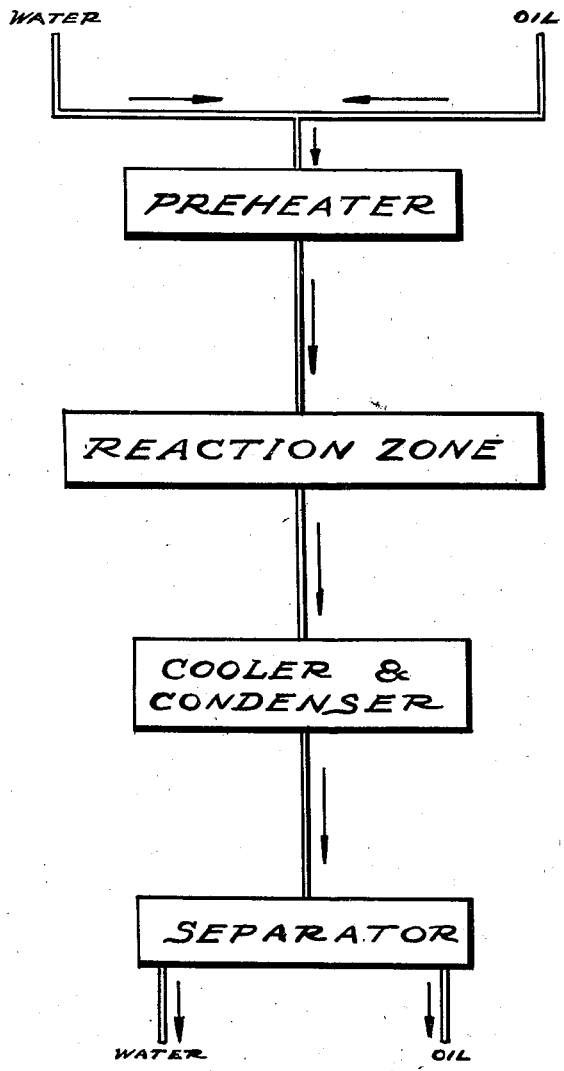

Patented Mar. 24, 1936

2,035,120

UNITED STATES PATENT OFFICE 2,035,120

PROCESS FOR OBTAINING VALUABLE DISTILLATES FROM HYDROCARBON OILS BY ACTION OF WATER UNDER HIGH PRESSURE AND TEMPERATURE

Henry O. Forrest, Andover, Leroy F. Marek, Cambridge, and Abraham White, Dorchester, Mass., assignors to Standard Oil Development Company, a corporation of Delaware Application July 7, 1930, Serial No. 466,197

3 Claims. (Cl. 196—64)

This invention relates to a process of treating mineral hydrocarbons, such as those of the petroleum type and preferably the heavier components thereof, to bring about certain transformations whereby from hydrocarbon oils whose constituents are of relatively high molecular weight there may be obtained a notable yield of liquid hydrocarbons of lower molecular weight without the wasteful decomposition and carbonization characteristics of pyrolytic cracking.

This result is achieved in accordance with the present invention by subjecting the heavier oil (which is to be transformed into a lighter oil) to the action of water at a high temperature, preferably for a relatively brief period and at a pressure greatly elevated above atmospheric.

The process, which is termed aquolysis, is intended primarily for the conversion of a heavier oil, such as gas oil and the like, into lighter oils or distillates, such as motor spirit (benzine, gasoline, petrol, etc.) bodies also applicable to various other refining and converting treatments of petroleum hydrocarbons. The motor spirit obtained by the process ordinarily possesses valuable anti-detonating qualities.

In this process of aquolysis a very high ratio or proportion of water to oil preferably is maintained, this ratio being varied according to the oil undergoing treatment and also with respect to the products required.

Considering this ratio first from the standpoint of the carbon atoms present in a molecule of average weight of the heavier hydrocarbon, there should be used a proportion of water preferably in excess of one mol water to each atom of carbon present in the hydrocarbon molecule.

On this basis a hydrocarbon molecule containing, for example, 30 atoms carbon would require at least 30 molecules of water in the aquolyzing treatment.

Since petroleum hydrocarbon fractions are mixtures of hydrocarbons of varying molecular weights, this proportion cannot be strictly maintained, but should be used only as a means of calculation based on average molecular weights.

Distillation ranges and other available data suffice roughly to ascertain the mean molecular weight to a degree adequate for carrying out the objects of the present invention.

Gas oil, which may be treated advantageously in this manner, will be used illustratively herein as the raw oil material. From a fractional distillation or other known methods of observation the mean molecular weight of a normal gas oil may be taken at, say, approximately 210.

Considering a saturated hydrocarbon of the series $C_nH_{2n+2}$, this mean molecular weight would indicate a molecule containing 16 carbon atoms. If the molecule with this number of carbon atoms were an olefin or a naphthene, the relation would not be materially altered from the present standpoint, since the diminished proportion of hydrogen in the latter hydrocarbons may be considered negligible in aquolysis.

In this way a minimum of 16 molecules of water to 1 molecule of hydrocarbon is indicated, or somewhat in excess of one part by weight of water to one part of the oil.

In the performance of the invention this molecular ratio of 16:1 is usually considerably exceeded. Preferably ratios of 50:1, 75:1, 100:1 and upwards are used, according to the raw material under treatment and production requirements.

As the proportion of water increases higher yields of lighter liquid products result and coke and tar formation can be substantially completely checked.

In pyrolytic cracking the breakdown of a saturated hydrocarbon is ordinarily considered to result in two fragments, a saturated and an unsaturated portion, the latter usually polymerizing in part to form heavy products which in turn may gradually become converted to tar and coke. Pyrolytic cracking, therefore, is characterized by polymerizing changes resulting in the formation of heavy as well as light hydrocarbons. For some reason polymerization appears to take place more rapidly under normal conditions of pyrolytic cracking than cyclicization of any single unsaturated fragment.

In the present invention so high a proportion of water is used that in the zone of transformation of a given hydrocarbon molecule there may be expected to be present many molecules of water acting as a diluent and thus separating the hydrocarbon molecules, thereby repressing the tendency to polymerization and giving time for each unsaturated fragment to repair its condition of instability by self-cyclicization or in other ways.

While water used in this manner serves usefully as a diluent, there are also indications of chemical action of the water on the hydrocarbon, to some extent at least. Water can be broken down at high temperatures in the presence of a hydrocarbon yielding hydrogen which may unite with an unsaturated fragment and oxygen which may likewise join a similar fragment or enter into combination with a saturated hydrocarbon. Oxides of carbon likewise may be formed. From the products of reaction of aquolysis traces of aldehydes, alcohols, organic acids, and the like, have been found, the presence of which can be explained by such water breakdown of limited extent. As noted above, preferably the period of exposure to aquolyzing conditions is very brief and the velocity of reaction of the various possible converting changes which may occur is governed in greater or less degree by the time of aquolysis. It will thus be seen that this period is a variable of importance.

Preferably aquolysis is conducted as a continuous or non-cumulative process by passing oil and water through a reaction zone heated to the requisite temperature. Preferably an exposure of the mixture in this zone for the period of only a few seconds is required, especially when the cross section of the reaction zone is small. With larger passages there may exist a lower rate of heat transfer and the period of aquolyzing exposure therefore may be somewhat more protracted. From a few seconds to a few minutes, however, normally is adequate for aquolyzing to the desired degree.

Figure 2:
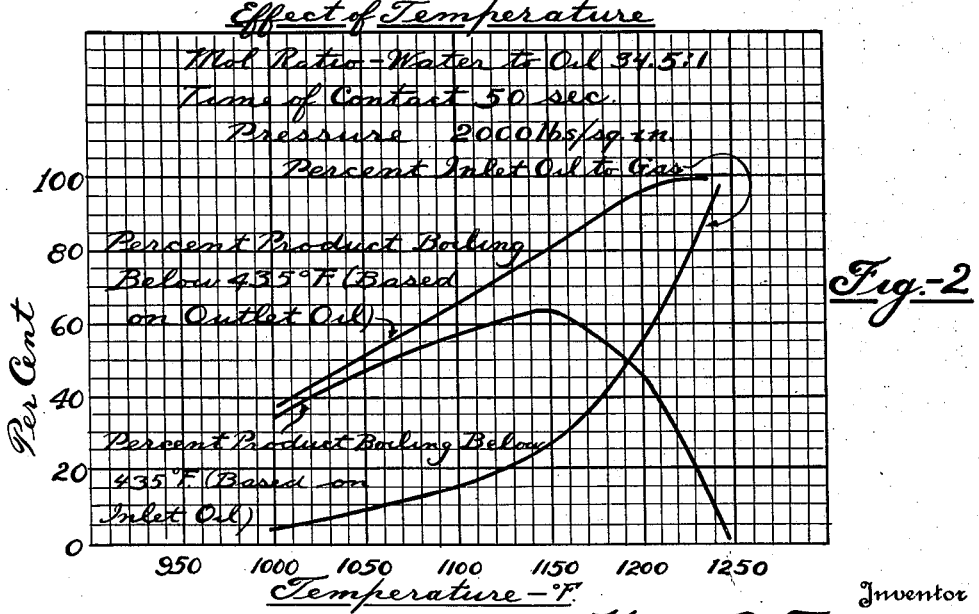
Figure 3:
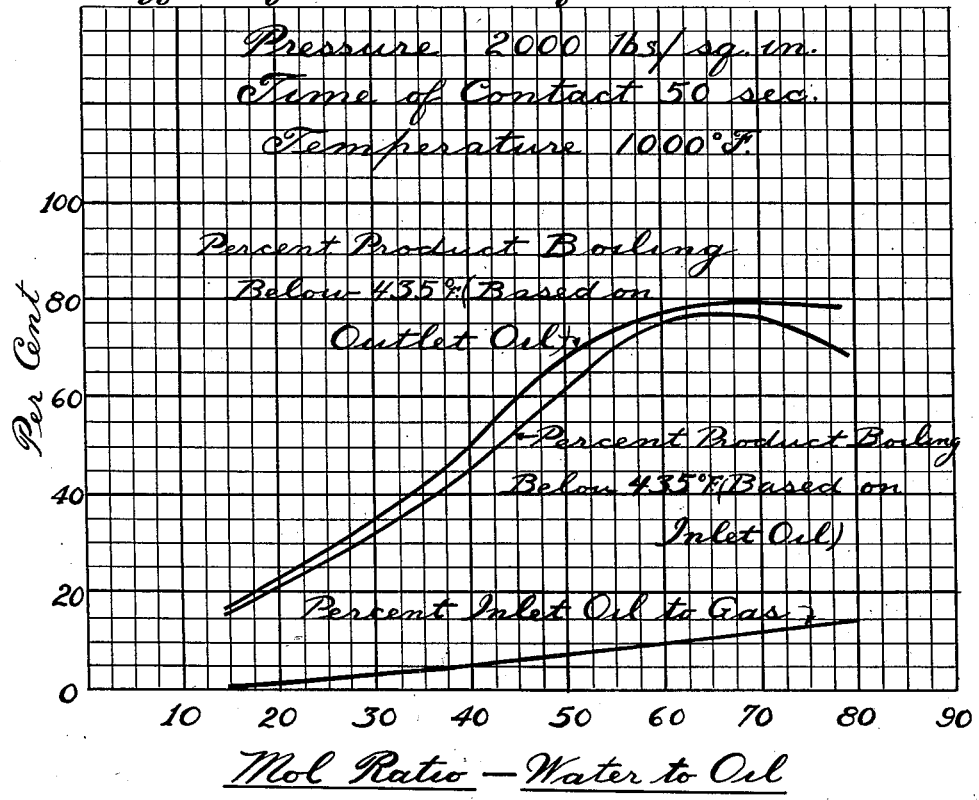

In the drawings,

Figures 1, 2 and 3 show graphs disclosing the effect of time, temperature and mol. ratio on aquolysis, Figure 4 is a diagrammatic representation on one method of conducting the process, and Figure 5 is a diagrammatic flow sheet of a suitable method of conducting the process of this invention.

The temperature in the aquolyzing zone may vary over a considerable range, for example, from 900 or 950° F. up to 1300° F. or even higher. For the most purposes a temperature somewhat above that used in ordinary commercial pyrolytic cracking is desired. A good optimum temperature is in the neighborhood of 1000° F., at which point excellent results can be obtained in the aquolyzation of gas oil. Oils of different qualities, as already point out, may be treated under modified conditions, including variations in aquolyzing temperature.

In pyrolytic cracking the higher the temperature the greater, as a rule, is the production of coke, tar and gases. The gas loss often is so great as to represent a very substantial diminution in the yield of volatile liquid hydrocarbons. Aquolyzation, on the other hand, may be carried out through a higher range of temperatures without objectionable gas loss in many cases and especially without formation of any deleterious proportion of coke and tar.

The pressures employed in aquolyzation are ordinarily very greatly in excess of atmospheric. Pressures of from 50 atmospheres and upwards are desirable. A good range is between 100 and 300 atmospheres. A good working pressure is about 200 atmospheres or perhaps slightly higher. In a general way the gas loss diminishes with higher pressures.

The following table shows the effect of pressure in the aquolysis of a gas oil:

*Effect of pressure*

| Mol. ratio steam: oil | Temperature ° F. | Time of contact seconds | Percent inlet oil to gas | Percent inlet oil to product boiling below 435° F. | Percent inlet oil to residue | Percent outlet oil to product boiling below 435° F. | Pressure lbs. per sq. in. |
|---|---|---|---|---|---|---|---|
| 18:1 | 1250 | 14 | 4.0 | 77.0 | 19.0 | 80.0 | 3,000 |
| 80:1 | 1000 | 50 | 3.6 | 82.5 | 11.5 | 88.0 | |
| 14:1 | 1250 | 20 | 10.8 | 62.5 | 27.7 | 70.0 | |
| 18:1 | 1250 | 14 | 13.0 | 60.0 | 27.0 | 68.0 | |
| 34.5:1 | 1250 | 11 | 11.0 | 70.3 | 18.0 | 83.0 | |
| 80:1 | 1000 | 50 | 15.0 | 68.0 | 17.0 | 80.0 | 2,000 |
| 14:1 | 1250 | 20 | 28.6 | 54.0 | 17.4 | 66.0 | |
| 34.5:1 | 1250 | 11 | 28.0 | 61.0 | 11.0 | 85.0 | 1,000 |

From the foregoing table the effect of pressure on gas formation, on the production of volatile liquid hydrocarbons boiling below 435° F., both on the oil admitted to the aquolyzing zone (inlet oil) and that collected at the exit (outlet oil) under comparable conditions of temperature, time of contact and mol. ratio is shown. From this table it will be clear that the proportion of inlet oil to gas is markedly suppressed by increase in pressure. The proportion of the product boiling below 435° F., determined on an outlet basis, is but slightly affected by pressure at otherwise fixed conditions. The resultant of these two effects on the proportion of product boiling below 435° F. on an inlet basis is to increase the product boiling below 435° F. (on an inlet basis) with increase in pressure, the effect being limited only by complete conversion.

More specific information is derived from the appended drawings which show graphs disclosing the effect of time, temperature and mol. ratio on aquolysis.

Figure 1 shows the effect of time of exposure in the aquolyzing zone, indicating the effect of this factor on gas formation and on the yield of liquid boiling below 435° F., determined both on inlet and outlet basis, using 2,000 lbs. pressure per square inch, a temperature of 1250° F., and a mol. ratio of water to oil of 26:1. The proportion of inlet oil to gas is a direct function of the time of contact. The percentage of liquid hydrocarbons of a boiling point range up to 435° F. increases rapidly with time of aquolyzation up to the time or times of contact at which 80–90 per cent of outlet oil is found converted to a liquid boiling below 435° F. The resultant of these two curves, the per cent product boiling below 435° F. on inlet basis, passes through a maximum at some time of contact, dependent upon the other conditions, such as pressure, temperature, and mol ratio. The general effect of time of contact is the same at other conditions of temperature, pressure, and mol ratio although the specific effect may vary.

The curve shown in Figure 2 indicates the effect of temperature of aquolyzation on gas formation on the product of liquid hydrocarbons boiling below 435° F., both on inlet and outlet basis, using 2,000 lbs. pressure per square inch, a time of contact in the aquolyzing zone of 50 seconds, and a mol ratio water to oil of 34.5:1. From the foregoing the following deductions may be made. The proportion of inlet oil converted to gas increases relatively slowly with increase in temperature below 1150° F. and more rapidly as the temperature exceeds 1150° F. The percent of liquid hydrocarbon product boiling below 435° F. on an outlet basis increases with temperature up to temperature at which 90 per cent of the liquid boils below 435° F. and more slowly thereafter. The resultant of these two curves, the per cent of liquid product boiling below 435° F. on an inlet basis, passes through a maximum at some temperature dependent upon conditions of pressure, time of contact and mol ratio of water to oil. This effect of temperature may be considered general, curves of the same approximate shape being obtained under other conditions.

Figure 3 is concerned with the effect of mol ratio of water to oil and shows the effect of modifying the proportion of water with respect to gas formation, to yield of liquid hydrocarbon products having a boiling point range below 435° F., both on an inlet and outlet basis while employing a pressure of 2,000 lbs. per square inch, a period of aquolyzation of 50 seconds in the heating zone at 1,000° F. The proportion of inlet oil to gas increases slowly with mol ratio of water to oil at low temperature (1000° F.) and more rapidly at higher temperature (1250° F.) (cf. other curves). The per cent of product boiling below 435° F. on an outlet basis increases with mol ratio water to oil up to mol ratios where the per cent below 435° F. reaches 80–90 percent depending upon other conditions, and slowly thereafter. The resultant of these two curves, the per cent product boiling below 435° F. on an inlet basis, increases with mol ratio water to oil, and passes through a maximum depending upon conditions of temperature, pressure, and time of contact. This effect of mol ratio water to oil is general and approximately similar curves will be obtained at other conditions.

Figure 4 is a diagrammatic representation of one method of conducting our process. Petroleum oil is supplied under pressure through line 1 and may be mixed with recycle oils from the process supplied through line 2. Oil is passed through fired coil 3 in furnace 4 and is heated to any desired temperature below that at which vaporization is appreciable. The heated oil is then mixed in line 5 with superheated steam, the steam-hydrocarbon mixture is passed through a second fired coil 6 in furnace 7 where complete vaporization of the mixture occurs, if not already secured at the time of mixing, and the mixture is heated substantially to the reaction temperature desired, say between 900 and 1300° F. The heated vapor is passed by line 8 into reaction chamber 9 which is suitably designed to withstand the severe operating conditions of temperature and pressure required. This vessel may be covered with a suitable layer of insulating material 10 and may in addition be heated externally or internally by suitable means, for example by electric resistance heater 11. This reaction vessel is much smaller than those customarily used in the treatment of petroleum at elevated temperatures and pressures and is designed with regard to the capacity of the fired coils and the rate of flow of material so that very short time of contact from about 0.1 minute to 2 minutes is secured. The reaction products are withdrawn by line 12 and cooled in exchanger 13 and cooler 14 and are passed to a liquid and gas separator vessel 15 operating at substantially full pressure. The liquid from this separator is passed by line 16 into an oil-water separator 17. Water is withdrawn by line 18 and may be discarded by line 19 if desired. However, this water may be recirculated by pump 20 and line 21 with or without suitable treatment for the recovery of oxygenated organic compounds at 22. Fresh water may be supplied from an outside source through line 23 and the mixture of fresh and recycled water is preheated in heat exchanger 13 and passed through line 24 into line 5 where it is mixed with the preheated petroleum oil from coil 3.

If it is desired to circulate gas with the steam-hydrocarbon mixture, the fixed gases leaving separator 15 by line 25 may be recompressed by compressor 26 and after suitable treatment at 27 for removal of light hydrocarbon vapors, oxides of carbon, hydrogen sulfide and the like the purified gas may be mixed with water vapor in line 24. Additional gas such as free hydrogen or nitrogen may be supplied under pressure through line 28. The water vapor or mixture of water vapor and gases in line 24 may be subjected to additional preheating, if desired, in a special coil (not shown) before the addition to the preheated petroleum oil vapors in line 5.

The oily product from the oil-liquid separator 17 is removed by line 29 and is passed by pump 30 through preheater 31 into distilling column 32 which may suitably be supplied with perforated plates 33, heating coil 34 and cooling coil 35 for purposes of rectification. Low boiling fractions of any desired end point, for example, about 435° F. may be withdrawn through line 36, condenser 37, separator 38 and line 39 to storage (not shown). Fixed gases may be released from separator 38 through line 40. The heavy fractions from tower 32 may be withdrawn through lines 41 and 42 to coolers and storage (not shown). These fractions may also be recirculated by pump 43, with or without additional fractionation to remove any small amounts of undesirable higher boiling fractions, through line 2 to oil preheater 3 where they are mixed with fresh oil.

If solid catalysts are used they may be placed in reaction vessel 9 in any desired form such as lumps, screens, grids or baffles and the like. Vaporizable catalysts may be supplied in admixture with any of the fluid materials such as fresh or recirculated oil, water or gas.

The oil and water introduced into the aquolyzing zone may be fed thereto as a mixture or emulsion or as two separate streams which mix at or in the aquolyzing zone. Whether in admixture or separately introduced, the components are preferably preheated, which may be effected by a suitable heat exchange involving withdrawal of heat from the products departing from the aquolyzing zone. To facilitate greater speed of aquolyzation, the entering components may be further preheated, if desired, by the application of additional heat subsequent to the heat exchange step.

As an example a mixture of water and gas oil in the mol ratio of 26:1 at a pressure of 2000 lbs., was passed through an aquolyzing zone at 1250° F., with time of treatment 15.7 seconds.

From the exit oil there was obtained on distillation light volatile liquid hydrocarbons of boiling point range below 435° F. amounting to 72 percent of the inlet oil. The bromine number of this distillate was 32 and the aniline point was 46. The gas loss amounted to 20 percent and the residue of boiling point above 435° F. had a specific gravity of .875 and aniline point of 57.

Using a somewhat lower proportion of water, namely, with mol ratio 18:1, but increasing the pressure to 3000 lbs., a mixture of the same grade of gas oil exposed in the aquolyzing zone for 13.5 seconds at a temperature of 1250° F. yielded an oil which on distillation was cut to 435° F. and the yield thereof was 77.5% of the feed. The bromine number of this distillate being 17.5 and the aniline point being 37.8° C. The residual oil was 11.5 percent and the gas loss was only 3.8 percent.

Using a considerably higher mol ratio water to oil, namely 80:1, and a pressure of 3,000 lbs., a mixture of preheated gas oil and water was forced through an aquolyzing zone of 1000° F. with time of exposure 50 seconds. The outlet oil on distillation yielded a naphtha boiling below 435° F. which amounted to 82.5 percent of liquid fed to the process. The bromine number of this distillate was 28.2 and the aniline point was 54° C. The oil remaining from this distillation amounted to 11.5 percent, exhibiting a specific gravity of .835 and an aniline point of 64° C. The gas loss was 3.6 percent, that is, still lower than was obtained in the preceding illustration using a lower mol ratio and higher temperature.

An Engler distillation determination of the whole liquid product, that is, light distillate and residue inclusive gave the following results:

| Initial | 96° F. |
|---------|--------|
| 10%     | 118    |
| 20      | 132    |
| 30      | 148    |
| 40      | 176    |
| 50      | 217    |
| 60      | 260    |
| 70      | 300    |
| 80      | 345    |
| 90      | 476    |

Another equolyzing run with a somewhat longer period of heat exposure, namely 65 seconds, using mol ratio 80:1, pressure 3,000 pounds and temperature 1000° F., with the same gas oil, gave 92.8 percent yield of liquid hydrocarbons of boiling point range below 435° F. The bromide number of this distillate was 18 and the aniline point was 41° C. The distillate when used as a motor fuel, possessed anti-knocking characteristics equivalent to an ordinary gasoline from a sweet crude to which about 45 percent of benzol has been added. The oil residue from the distillation was 3.8 percent and exhibited a specific gravity .844. This residue was free from tar and coke and other indications of polymerization accompanied by drastic decomposition. Despite the high temperature, which would be expected under conditions of pyrolytic cracking to form much coke, the residual oil, in large measure, resembled the original gas oil in appearance and in fact possessed a specific gravity not far from that of the original oil.

From the foregoing curves and specific illustrations it will be evident that our process involves the heat treatment of a hydrocarbon oil with a preponderating portion of water or other aqueous medium, preferably using so high a ratio that the normal rate of collision between hydrocarbon molecules which are being subjected to heat treatment is greatly reduced while at the same time such hydrocarbon molecules are subjected to continuous bombardment by water molecules. While not limiting ourselves to the foregoing theoretical considerations, we attach great importance to the separation, as it were, of hydrocarbon molecules by an intervening diluent, preferably of an aqueous character, in order to minimize intermolecular combination and permit of a maximum degree of intermolecular rearrangement. In this way from heavy oils there may be obtained high yields of low boiling components adapted for use as motor spirit with practically no concomitant formation of tar and coke and with a time contact or heat treatment in the conversion or rearrangement step expressed ordinarily in seconds whereby a large output of the low boiling components may be obtained from comparatively small units.

In the preferred form of the invention a pressure in the region of 3000 lbs. per square inch or approximately 200 atmospheres, a temperature in the neighborhood of 1,000° F., and a proportion of water to oil represented by from approximately 25 to 75 mols of water to 1 mol of hydrocarbon, are used. Expressed in another way, there may be used to a pound of oil from 1 to 5 or 6 pounds of water, preferably carrying the temperature of aquolyzation above the critical.

In any event, we prefer to employ temperatures at which oil and water are completely in the state of vapors, in order to secure that miscibility which is absent when one component or some part thereof is in a liquid state. By operating at pressures and temperatures above the critical, certain phenomena obtain which are favorable to conversion and practice of the invention in a most efficient manner.

What we claim is:

1. The process which comprises subjecting a mixture of water and gas oil in the average mol ratio of approximately 80:1 to a temperature of approximately 1000° F. and to a pressure of approximately 3,000 lbs. per square inch for a period not to exceed 2 minutes, whereby at least three-fourths of said oil is converted into antiknock motor spirit without any substantial polymerization leading to carbonization.

2. The process which comprises subjecting a mixture of water and relatively heavy petroleum oil in an average mol ratio of approximately 80:1 to a temperature of approximately 1000° F. and to a pressure of approximately 3,000 lbs. per square inch for a brief period, whereby at least three-fourths of said oil is converted into antiknock motor spirit without any substantial carbonization.

3. The process which comprises subjecting a mixture comprising water and a relatively heavy petroleum oil in the average mol ratio of approximately 80:1 to a temperature of approximately 1000° F. and to a pressure of approximately 3,000 lbs. per square inch for a period ranging from 10 to 100 seconds, whereby at least three-fourths of said oil is converted into volatile motor spirit without any substantial carbonization.

HENRY O. FORREST.
LEROY F. MAREK.
ABRAHAM WHITE.